United States Patent [19]

Okada et al.

[11] Patent Number: 4,638,477
[45] Date of Patent: Jan. 20, 1987

[54] PACKET EXCHANGE DATA TRANSMISSION SYSTEM

[75] Inventors: Jun Okada; Koichi Kunimasa, both of Hadano; Hiroshi Nakase, Fujisawa, all of Japan

[73] Assignee: Hitachi, Ltd., Tokyo, Japan

[21] Appl. No.: 686,593

[22] Filed: Dec. 26, 1984

[30] Foreign Application Priority Data

Dec. 26, 1983 [JP] Japan ................................. 58-243885

[51] Int. Cl.$^4$ ............................................. H04J 3/26
[52] U.S. Cl. ......................................... 370/94; 370/89
[58] Field of Search ............................. 370/60, 94, 89; 340/825.5

[56] References Cited

U.S. PATENT DOCUMENTS

| | | | |
|---|---|---|---|
| 4,287,592 | 9/1981 | Paulish | 370/94 |
| 4,320,500 | 3/1982 | Barberis et al. | 370/94 |
| 4,556,972 | 12/1985 | Chan et al. | 370/94 |
| 4,561,090 | 12/1985 | Turner | 370/94 |

*Primary Examiner*—Douglas W. Olms
*Attorney, Agent, or Firm*—Antonelli, Terry & Wands

[57] ABSTRACT

At least two packet exchangers are interconnected through an external transmission line to transmit a data packet. Each packet exchanger comprises a main controller for processing the data packet sent from a packet terminal, in a data link level and a packet level, and a connecting unit for sending the data packet sent from the main controller to the external transmission line and sending the data packet sent from the external transmission line to the main controller.

2 Claims, 11 Drawing Figures

PACKET EXCHANGE DATA TRANSMISSION SYSTEM

BACKGROUND OF THE INVENTION

The present invention relates to a packet exchange data transmission system, and more particularly to a packet exchange data transmission system suitable to an ultra high speed data transmission between packet exchangers.

In a data transmission between packet exchangers in a prior art packet exchange data transmission system, a high level data control (HDLC) procedure and a packet level control procedure are adopted in accordance with a CCITT standard protocol and it is usually implemented by a programmable data processing system.

FIG. 1 shows a configuration of a packet exchange network having three packet exchangers, and FIG. 2 shows a basic data format of a data packet transmitted through a line.

A packet terminal 1 transmits a data packet having a format as shown in FIG. 2 to a packet exchanger 3 through a subscriber line 2, the packet exchanger 3 transmits the packet to a packet exchanger 5 or a packet exchanger 9 through a trunk circuit 4 or a trunk circuit 8, the packet exchanger 5 transmits the packet data received through the trunk circuit 4 or the trunk circuit 10 to a packet terminal 7 in the format shown in FIG. 2 through a subscriber line 6, and the packet terminal 7 is similar to the packet terminal 1.

The format of the packet data transmitted through the subscriber line 2 or 6 comprises, as shown in FIG. 2, four fields, that is, a user data 24, a packet header 23 which is used in the packet level control procedure and contains destination information of the packet, a data link control (DLC) header 21 used in the HDLC procedure and a data link control (DLC) trailer 22. In the HDLC procedure, the DLC header 21 comprises a flag (F) indicating a beginning of frame, an information indicating a transmission direction of the frame and a control (C) indicating a type and a sequence of the frame. The DLC trailer 22 comprises a data error check code FCS (frame check sequence) and a flag (F) indicating an end of frame. The data error check code (FCS) is an error check information generated, under a certain logic, based on information excluding the flags (F) indicating the beginning and the end of the frame and the data error check code (FCS). The packet header 23 and the user data 24 are collectively referred to as a data packet, and the data packet, the DLC header and the DLC trailer are collectively referred to as a frame.

The packet exchanger 3 checks the FCS of the frame including the data packet received from the packet terminal 1 and detects a data error between the packet terminal 1 and the packet exchanger 3. It also checks the sequence information contained in the control C to detect a loss of frame. When it detects the data error or the loss of frame, it sends a negation response to the packet terminal 1 in accordance with the HDLC procedure and request retransmission of the data. When the packet exchanger 3 normally receives the frame, it selects a path by the destination information contained in the packet header 23 and sends the data packet in the frame format shown in FIG. 2 to the packet exchanger 5 connected to the packet terminal 7. The packet exchanger 3 modifies a portion of the frame such as the destination information contained in the packet header 23, reconstructs the FCS and sends the data package to the trunk circuit 4. The packet exchanger 5 checks the FCS and the sequence of the control C of the received frame, identifies the packet terminal 7 by the destination information contained in the packet header 23 and sends the data packet to the packet terminal 7.

When the trunk circuit 4 cannot be used by an obstacle, the packet exchanger 5 sends the data packet to the packet terminal 7 through the trunk circuit 8, the packet exchanger 9 and the trunk circuit 10. Accordingly, the packet exchanger does not always receive the data packet in the same order as the packet terminal 1 transmits the data packet, and the packet exchanger 5 rearranges the packet data in accordance with the packet sequence information C contained in the packet header 23.

In the past, the packet exchangers 3, 5 and 9 were implemented by a single programmable processor, but as the development of the microprocessor, they are recently constructed by a plurality of processors. FIG. 3 shows a prior art packet switching network comprising the packet exchanger 3 and the packet exchanger 5.

In FIG. 3, a packet exchanger 103 has a plurality of main controllers 132 and 134 interconnected by a high speed interface 133 which is a common transmission line, and the subscriber line 2 and the trunk circuit 4 are connected to the main controllers 132 and 134 through communication controllers 131 and 135, respectively. The main controller 132 is a subscriber line processor and the main controller 134 is a trunk circuit processor. The preparation and check of the FCS in accordance with the HDLC procedure are carried out by the communication controllers 131 and 135, and the sequence control and the recovery procedure for the error are carried out by the main controllers 132 and 134. The control of the packet level procedure is carried out by the main controllers 132 and 134. The operation of the packet exchanger 105 is identical to that of the packet exchanger 103. The main controllers 132 and 134 are usually microprocessors whose processing steps are at least 2-5 K steps per packet which comprises 100 bytes in average. Assuming that the microprocessor has a processing ability of 1 microsecond per step and a utilization factor is 100%, a maximum transmission rate is 160-400 K bits/second. Taking competition in the high speed interface 133 and the utilization factor of the main controllers 132 and 134 into consideration, a practical transmission rate is 64 K bits/second at maximum unless the performance of the microprocessor is significantly improved.

However, as the communication technology is developed, a line service at a transmission rate of several mega-bits/second or several hundreds mega-bits/second for an optical fiber line is expected, and such an ultra high speed line will be used in the packet switching network as the trunk circuit.

In order to increase the transmission rate of the trunk circuit 4, the use of multiplexors 41 and 42 (FIG. 4) has been proposed. In FIG. 4, the multiplexers 41 and 42 are used so that data on a plurality of low speed lines 43 and 44 are multiplexed onto a high speed trunk circuit 4' instead of the trunk circuit 4 of FIG. 3. In this system, since the plurality of low speed lines 43 and 44 are used, n main controllers 134-1, ... 134-n and 154-1, ... 154-n are used instead of the main controller 134. The number of the main controlles is determined by the transmission rate of the low speed line 43 or 44 and the performance of the main controller. In FIG. 4, the subscriber line main controllers 132 and 152 to which the subscriber lines 2 and 6 are connected are omitted, although they are actually connected as shown in FIG. 3. This system has the following disadvantages.

(1) The number of main controllers increases and this leads to the increase of the size and cost of the packet exchanger. For example, when the data transmission rate of one main controller is 64 K bits/second, the transmission rate of the trunk circuit shown in FIG. 3 is 64 K bits/second, the transmission rate of the low speed lines 43 and 44 are 64 K bits/second and the transmission rate of the trunk circuit 4' is 384 K bits/second, then six main controllers are required to maintain the transmission rate of the trunk circuit 4'.

(2) The transmission rate of the trunk circuit 4' is increased and a throughput is improved, but when the trunk circuit 4' is used in a time slot allocation time-division fashion, the transmission rate of the trunk circuit 4' is increased up to only 64 K bits/second so long as the communication between the packet terminals 1 and 7 is concerned, and it does not significantly differ from the transmission rate of the trunk circuit 4 shown in FIG. 3. Accordingly, a response time between the packet terminals 1 and 7 is not significantly improved over that of the system shown in FIG. 3.

(3) When the time division system in the multiplexer 41 is such that a time slot is periodically allotted to each of the low speed lines 43, non-used time slots may exist depending on a traffic of packets handled by the main controllers 134-1, ... 134-n, and the utilization factor of the trunk circuit 4' is not improved.

In the system shown in FIG. 3, even if the number of trunk circuits 4 is increased and the number of main controllers 134 is increased accordingly, the problems of (1) and (2) are not resolved.

SUMMARY OF THE INVENTION

It is an object of the present invention to provide a packet exchange data transmission system which enables an ultra high speed data transmission between packet exchangers.

In order to achieve the above object, in accordance with the present invention, there are provided at least two packet exchangers each comprising a main controller connected to one end of a subscriber line having a packet terminal connected to the other end thereof for processing a data link level and a packet level for data packets sent from the packet terminal and a connecting unit connected to the main controller through an internal transmission line for temporarily storing the data packet sent from the main controller and then sending it to an external transmission line and temporarily storing the data packet sent through the external transmission line and sending it to the main controller through the internal transmission line so that a data link is established between one main controller and other main controller for the two packet exchanges interconnected through the external transmission line and the data packets are transmitted through one transparent transmission line including the pair of internal transmission lines, the pair of connecting units and the external transmission line.

DESCRIPTION OF THE PREFERRED EMBODIMENTS

Figure 3:
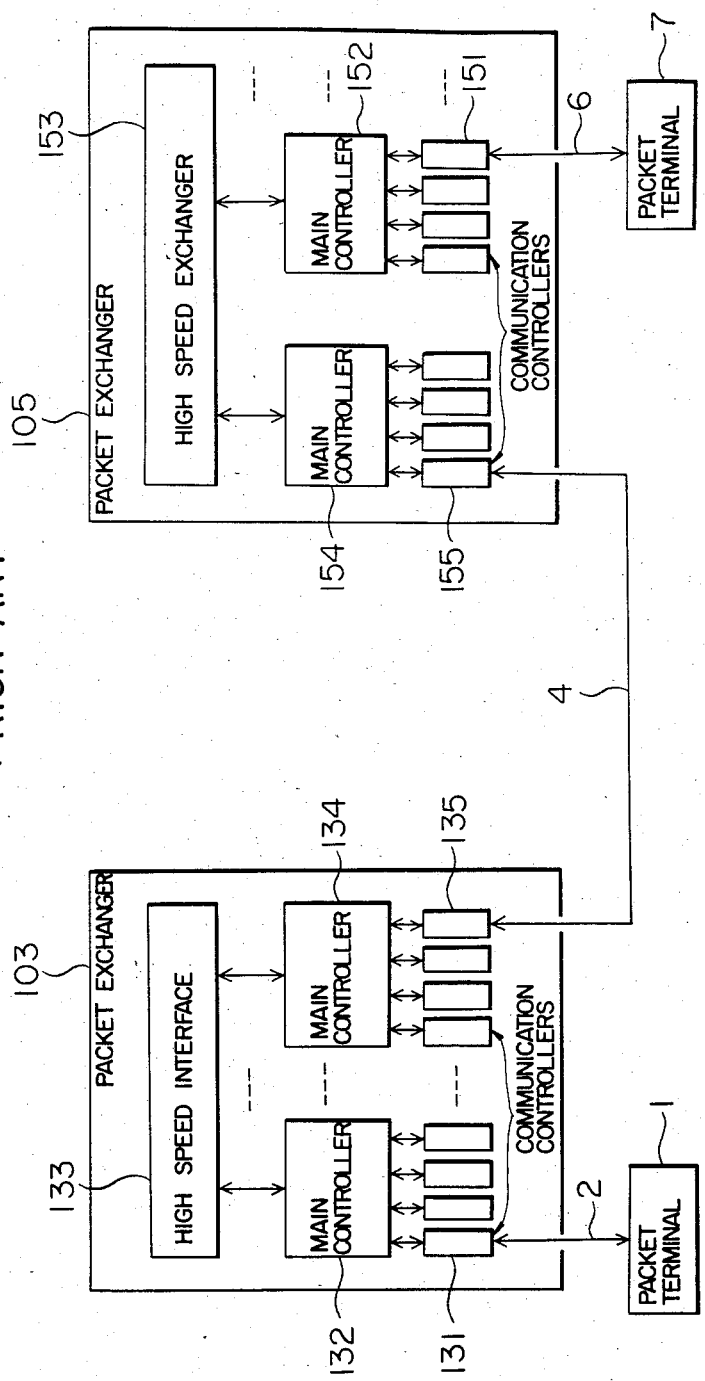
FIG. 3 shows a configuration of a prior art packet exchanger.
Figure 4:
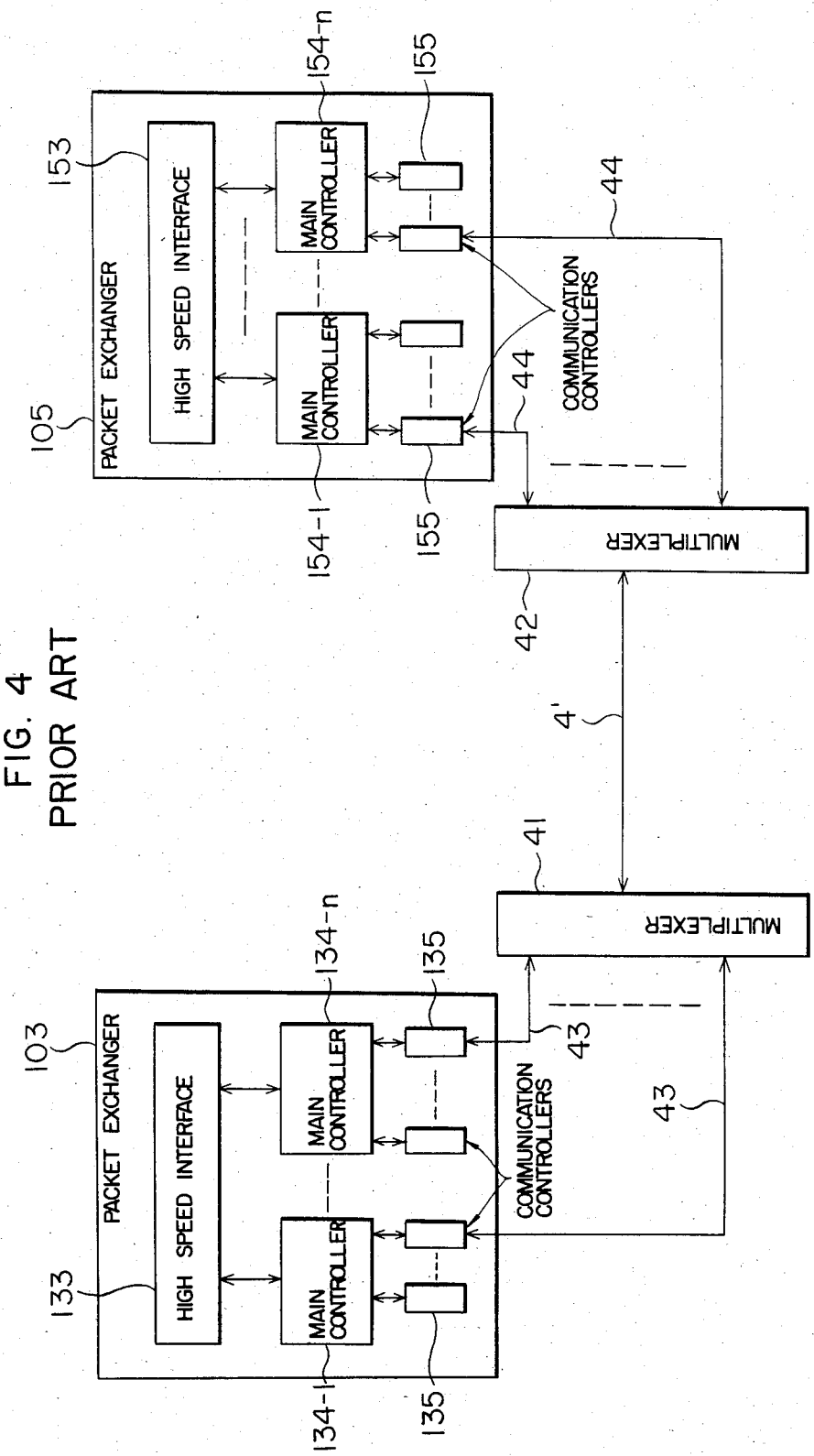
FIG. 4 shows a configuration of another prior art packet exchanger.
Figure 5:
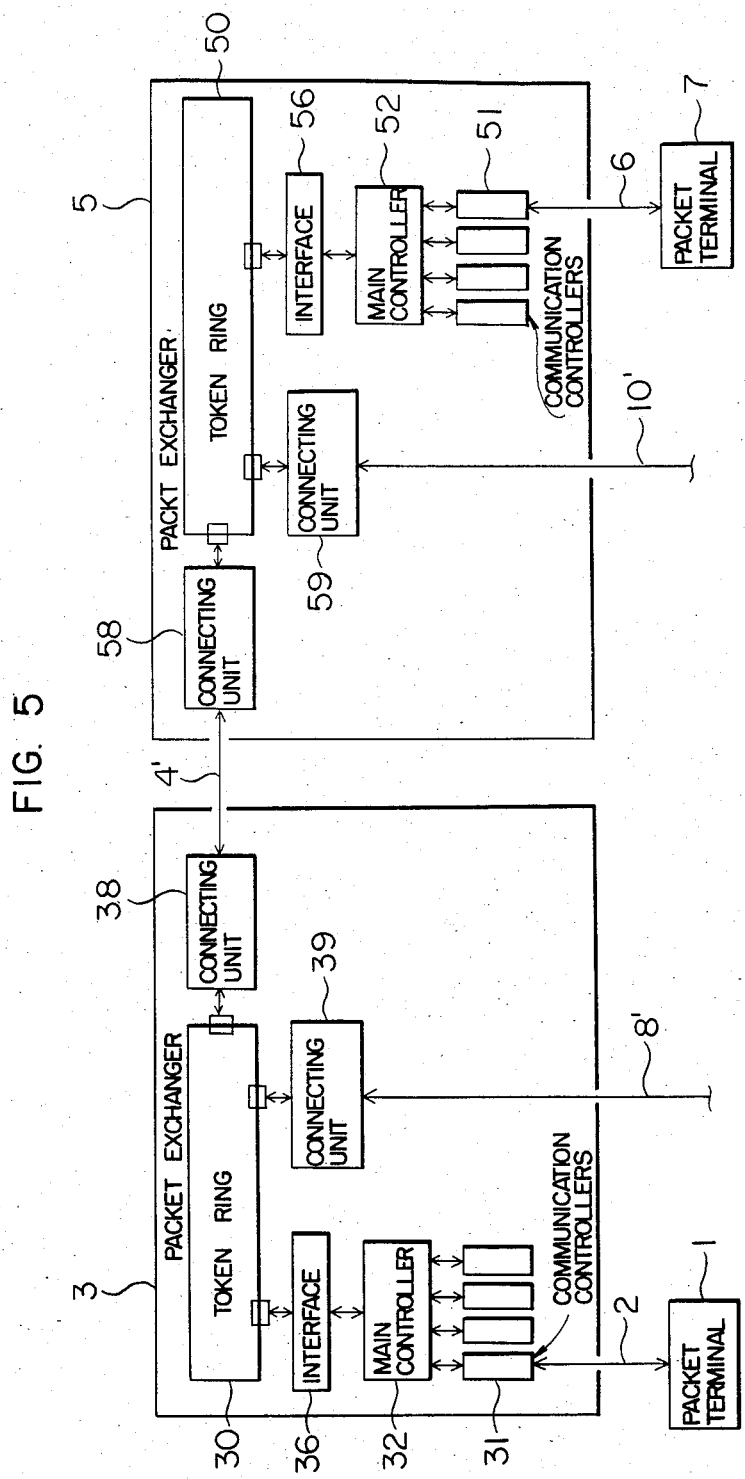
FIG. 5 shows a configuration of one embodiment of a packet exchanger of the present invention.

FIG. 5 shows a configuration of one embodiment of the present invention which comprises a packet exchanger 3 and a packet exchanger 5. Communication controllers 31 and a main controller 32 control the HDLC procedure and the packet level for a subscriber line 2 and controls the HDLC procedure to communicate with other main controller 32 or a main controller 52 of a packet exchanger 5 through a token ring 30, a connecting unit 38, a trunk circuit 4', a connecting unit 58 and a token ring 50. They correspond to the communication controllers 31 and the main controller 32 of FIG. 3.

Figure 1:
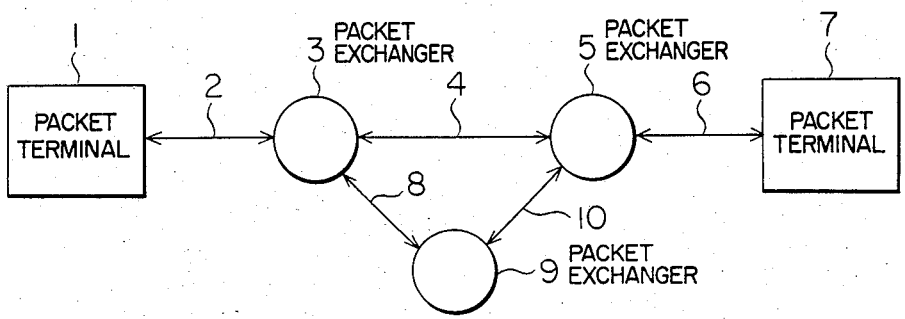
FIG. 1 shows a configuration of a packet switching network.

Communication controllers 51 and main controller 52 carry out the same processing to a subscriber line 6 as that of the communication controllers 31 and the main controller 32. The token rings 30 and 50 may be constructed by optical fibers which are connected in loop to form internal transmission lines of the packet exchangers. Information is transmitted through the transmission line in a token access method, in which, as is well known, one of stations connected to the token rings 30 and 50 which graspes a token obtains a transmission right. In the present embodiment, the main controllers 32 and 52 correspond to the stations. The interface circuits 36 and 56 are interfaces to connect the main controllers 32 and 52 to the token rings 30 and 50, respectively, and they add and check the FCS for the packets transmitted and received by the main controllers 32 and 52, read in frames addressed to their own stations sent from the upstream stations through the token rings 30 and 50, repeat and pass to the down stream stations the frames not addressed to their own stations, and transmit the frames to be transmitted to their own stations to one-packet downstream stations when they detect the tokens. The connecting units 38 and 39 are connected to the token ring 30 and the connecting units 58 and 59 are connected to the token ring 50. The connecting units 38, 39, 58 and 59 read in frames sent from the upstream stations and addressed to other token rings than the token rings to which they are connected, repeat and send to the downstream stations the frames not addressed to the other token ring and transmit the frames to be transmitted to the downstream stations when they detect the tokens. The connecting units 38, 39, 58 and 59 include memories and store the read-in frames in the memories and then send the frames to the trunk circuit 4', and store the frames received from the trunk line 4' in the memories and then send them to the token rings connected thereto. Since the connecting units 38, 39, 58 and 59 do not have their own station addresses, they are not stations as are the main controllers 32 and 52. Stations to send tokens to the token rings 30 and 50 are necessary. To this end, control stations separate from the main controllers 32 and 52 may be connected to the token rings 30 and 50 so that the control stations can send the token, or one of the plurality of main controllers 32 may be a station to send the token. The same is true for the main controllers 52. The trunk circuits 8' and 10' are high speed external transmission lines corresponding to the trunk circuits 8 and 10 shown in FIG. 1.

Figure 6:
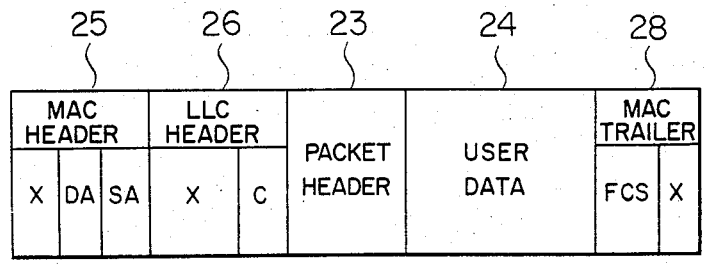
FIG. 6 shows a data format of a frame transmitted between main controllers.

The format of the frame transmitted between the main controllers 32 or between the main controller 32 and the main controller 52 and the control system therefor are now explained. In the token ring system being discussed by the IEEE Project 802, the data link level layer for controlling the HDLC procedure is divided into two sub-layers, a lower sub-layer being a media access control (MAC) and an upper sub-layer being a logical link control (LLC). FIG. 6 shows a data format of the frame in this token ring system, applied to the present invention. A MAC header 25 contains a destination address (DA) and a source address (SA). The destination address (DA) is used to identify the destination address in the MAC level. The destination address (DA) comprises two portions and a higher order bit represents a destination token ring number and a lower order bit represents an address of the main controller (station) directly connected to the destination token ring. A MAC trailer 28 includes an FCS which is checked and generated by the interface circuits 35 and 56 in the MAC level. An LLC header 26 includes a control (C) which is used to control the sequence of frames by the main controllers 32 and 52 in the LLC level. The field shown by X in the MAC header, LLC header and MAC trailer of FIG. 6 are not relevant to the present invention and the explanation thereof is omitted. The interface circuits 36 and 56 process in the MAC level, identify the destination address (DA), and check and generate the FCS in the MAC trailer 28. The main controllers 32 and 52 control the LLC level.

Figure 7:
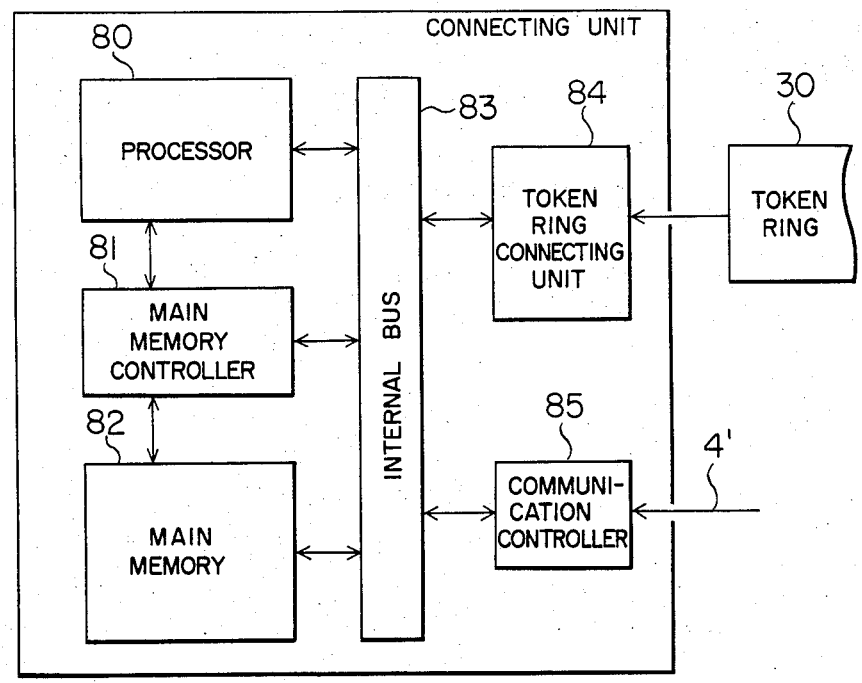
FIG. 7 shows a configuration of a connecting unit 38.

FIG. 7 shows a configuration of the connecting unit 38. (The connecting units 39, 58 and 59 are similar thereto.) A token ring connecting unit 84 is an interface to the token ring 30 and it temporarily stores the frame transmitted from the upstream station and addressed to destination token ring in a main memory 82 through a DMA which comprises an internal bus 83 and a main memory controller 81 in order to absorb a difference between the transmission rate of the token ring 30 and the transmission rate of the trunk circuit 4, repeats the frame addressed to the token ring other than the destination token ring and transmits it to the downstream station, and when the token is detected, reads out the frame to be transmitted from the internal bus 83 and the main memory controller 81 and transmits it to the downstream station. When the token ring 30 is an optical fiber token ring, the token ring connecting unit 84 converts the light signal to the electrical signal. A communication controller 85 reads out the frame from the main memory 82 through the DMA comprising the internal bus 83 and the main memory controller 81 and sends it to the trunk circuit 4'. When the trunk circuit 4' is an optical fiber transmission line, the communication controller 85 converts the light signal to the electrical signal. The connecting unit 38 and the connecting unit 58 are interconnected by the trunk circuit 4' in a physical interface level. A processor 80 activates the token ring connecting unit 84 and the communication controller 85 and processes an end interruption at the end of the transfer of the frame between the token ring 30 and the main memory 82 or between the trunk circuit 4' and the main memory 82. The processor 80 further allocates and releases a buffer for the frame on the main memory 82. The main memory controller 81 processes an access request from the processor 80, token ring connecting unit 84 or communication controller 85 to the main memory 82. The token ring connecting unit 84 makes no check to the frame received from the token ring 30 and temporarily stores it in the main memory 82 as it is. The communication controller 85 makes no check or adds no information to the frame read from the main memory 82 and sends it to the trunk circuit 4' as it is. The transfer of the frame received from the token ring 30 and supplied to the connecting unit 38, to the trunk circuit 4' is processed in the MAC level in accordance with only the destination address of the MAC header 25 and the source address, and the FCS is not checked nor generated. The processing in the LLC level rn accordance with the sequence of frames of the LLC header is not carried out. As a result, the transfer of the frame from the token ring 30 to the trunk circuit 4' through the connecting unit 38 is very fast. In this manner, the link in the LLC level is established between the main controller 32 and the main controller 52, and when an FCS error or an error in the sequence of the control (C) is detected, a retransmission of the frame is carried out between the main controller 32 and the main controller 52. Accordingly, there is no need to transmit and receive the data in the HDLC procedure between the main controllers 134 and 154 as is done in the prior art system, and the data can be directly transmitted and received between the main controller 32 and the main controller 52, and the connecting unit 38 is transparent to the main controller 32 and the main controller 52.

The control in accordance with the present embodiment is now explained for the transmission of the packet from the packet terminal 1 to the packet terminal 7 shown in FIG. 5. First, the control between the packet terminal 1 to the main controller 32 through the communication controller 31 is explained.

Figure 2:
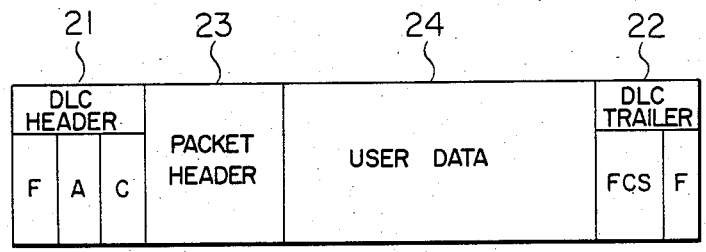
FIG. 2 shows a data format of a data packet transmitted.
Figure 8:
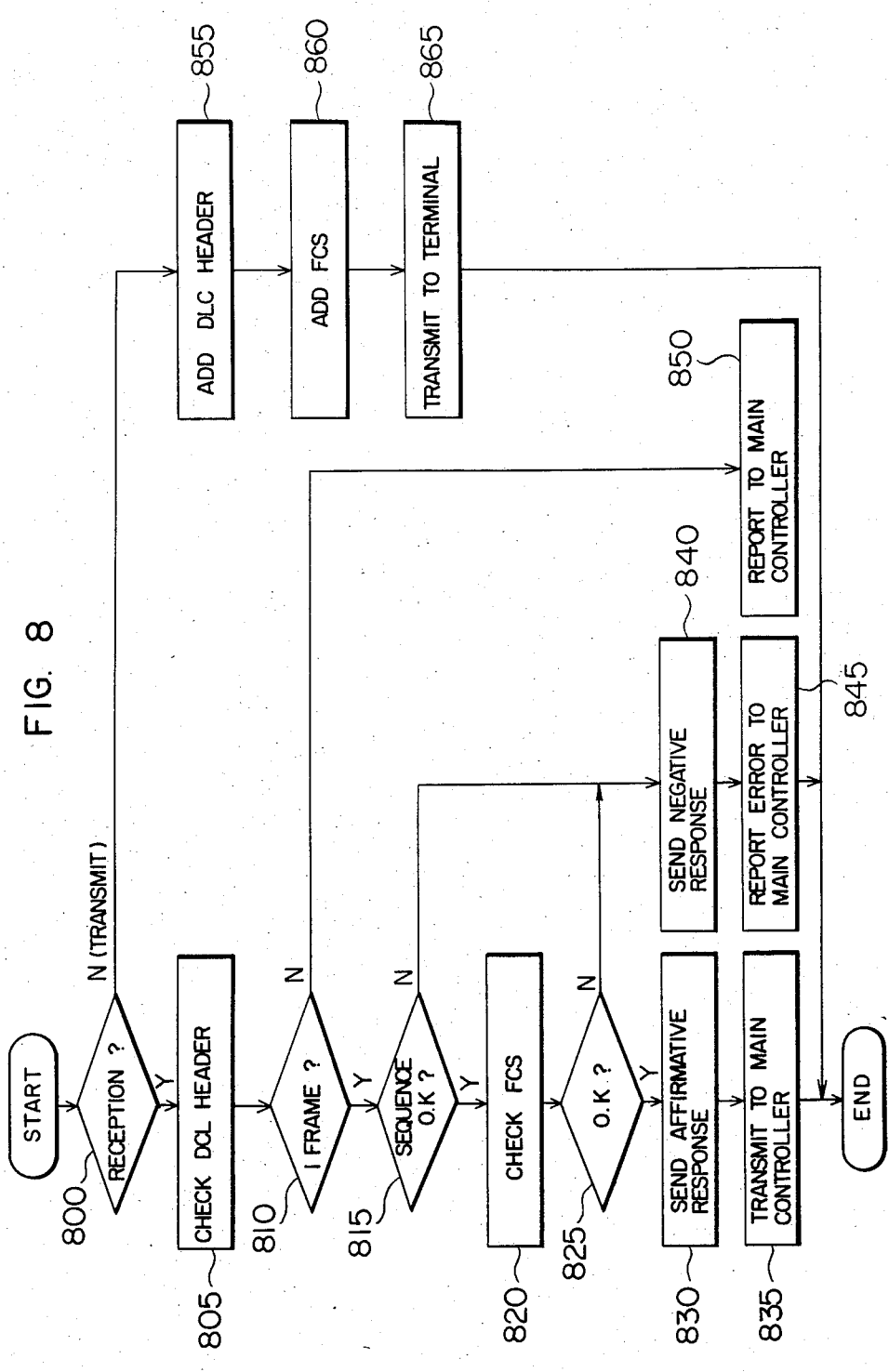
FIG. 8 is a flow chart showing a control of a communication controller 31.

The packet terminal 1 sends the data packet shown in FIG. 2 to the communication controller 31. Referring to a flow chart of FIG. 8, the control by the communication controller 31 is shown. The communication controller 31 checks if it is in a reception status or not (800), and checks if a type of frame is I (information) or not and if the sequence of numbers is correct by the control (C) of the DLC header 21 of the data packet (805, 810, 815). If the sequence of numbers is incomplete, it reports a sequence error of the frame to the packet terminal 1 by a negative response (840, 845) and requests retransmission of the frame. It compares a data error check code FCS (frame check sequence) of the DLC trailer 22 with the code derived from the frame and check the equality therebetween (820, 825). If they are unequal, it reports a data error of the frame to the packet terminal 1 by a negative response (840, 845).

If no data error is detected, it sends an affirmative response to the packet terminal 1 and delivers the packet header 23 and the user data 24 of the data packet to the main controller 32 (830, 835).

Figure 9:
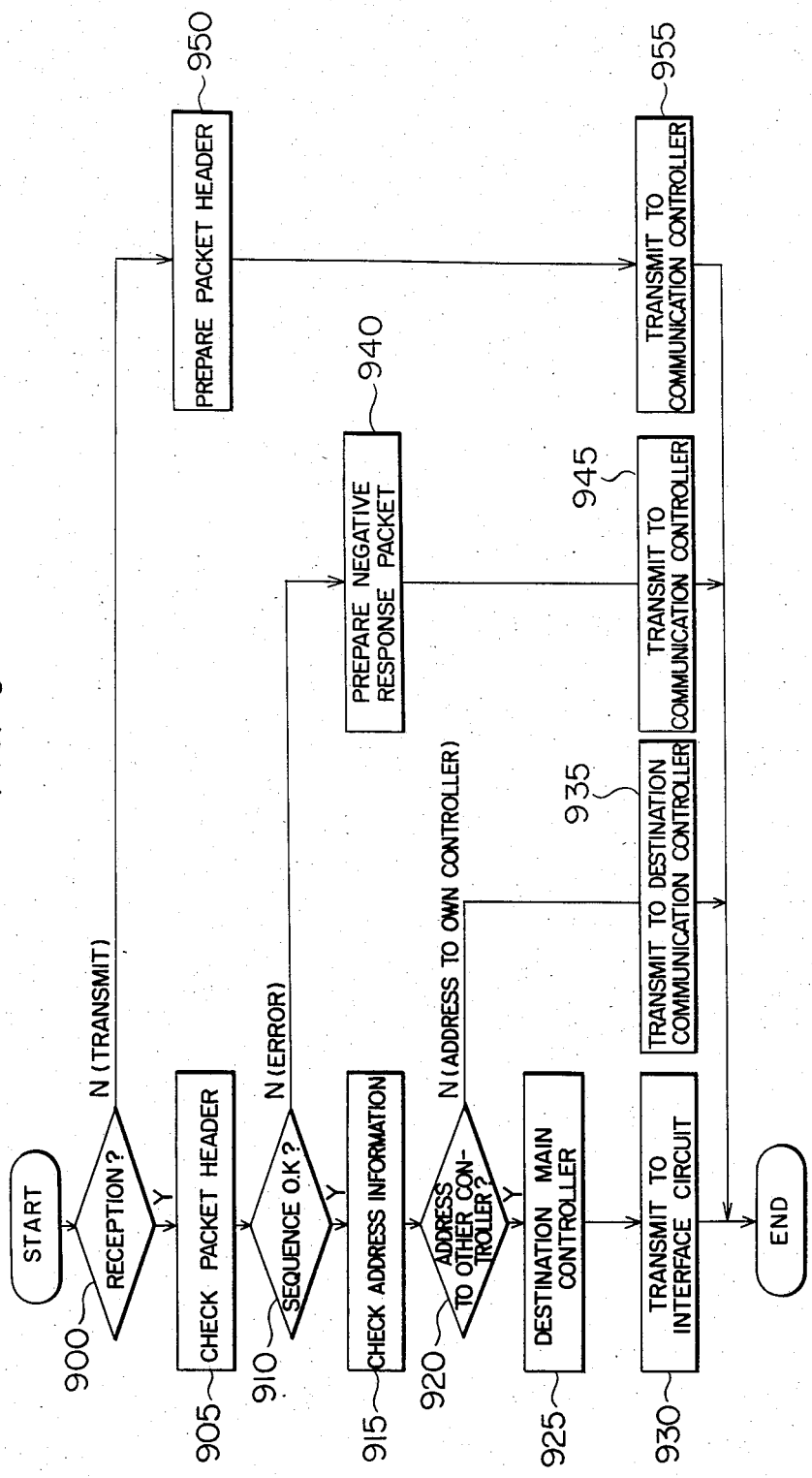
FIG. 9 is a flow chart showing a control of a main controller 33.

Referring to a flow chart of FIG. 9, the control by the main controller 32 is explained. The main controller 32 checks if it is in a reception state (900) and checks a serial number of the packed stored in the packet header 23 to check if there is a loss of packet (905, 910). If there is a loss of packet, it prepares a negative response packet, delivers it to the communication controller 31 (940) which checks if it is in a transmission state (800), prepares and adds a DLC header and a DLC trailer (855, 860) and sends a negative response packet to the packet terminal 1 (865). If the packet is normal, the main controller 32 checks an address by address information stored in the packet header 23 (915, 920). Since it is the address to the packet terminal 7, it is not in the communication controller 31 connected to its own main controller 32 nor in other main controller 34 in its own token ring. Accordingly, the destination packet terminal 7 adds information of connection to the main controller 52 (925) and delivers the packet header 23 and the user data 24 to the interface circuit 36 (930).

Figure 10:
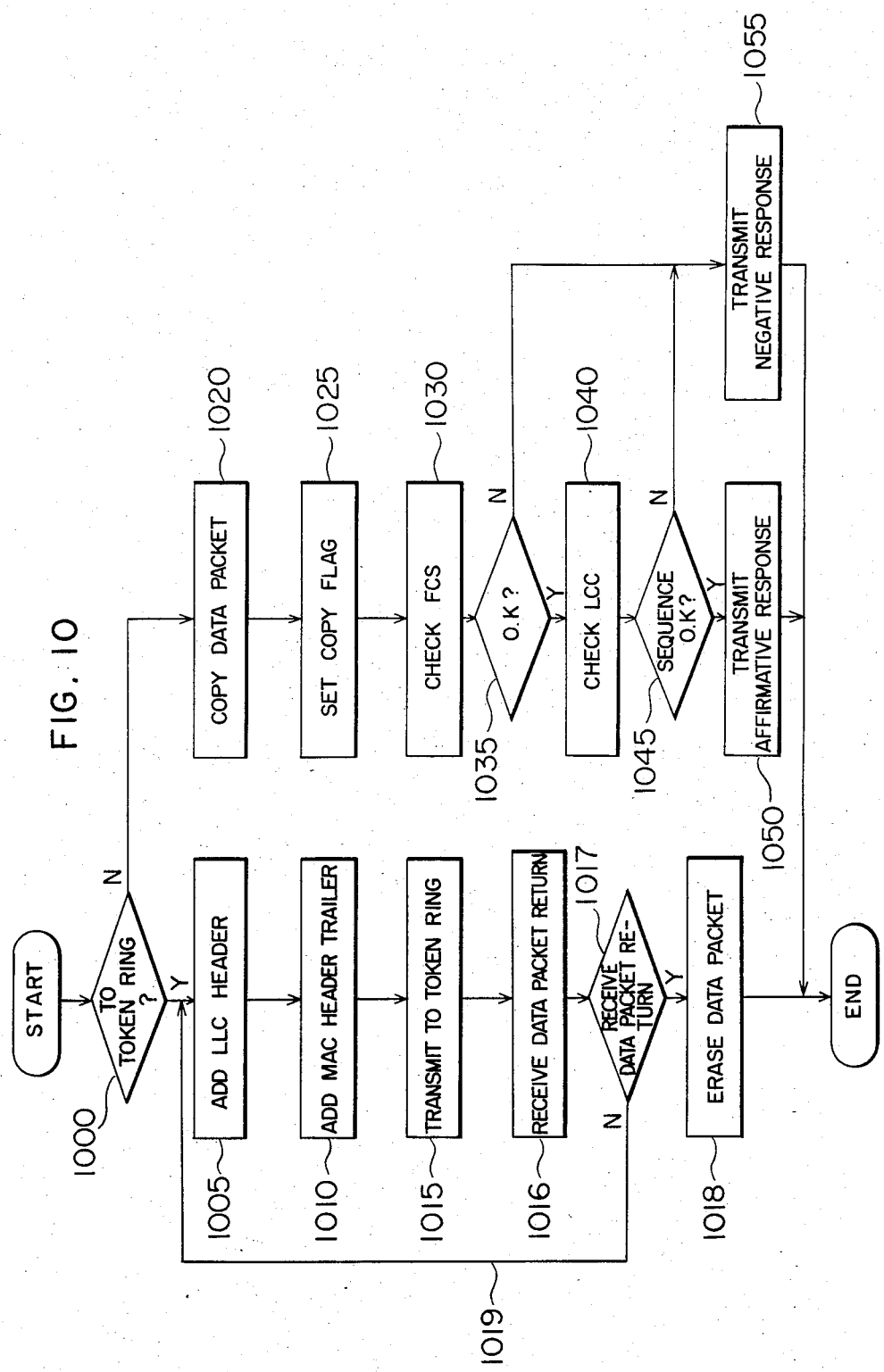
FIG. 10 is a flow chart showing a control of an interface circuit 36.

Referring to a flow chart of FIG. 10, the control by the interface circuit 36 between the interface circuit 36 and the connecting unit 38 is explained. The interface circuit 36 checks if the packet is addressed to the token ring (1000), and if it is, it adds the LLC header 26, MAC header 25 and MAC trailer 28 shown in FIG. 6 to the packet header 23 and the user data 24 (1005, 1010, 1015). The LLC header 26 is substantially identical to the DLC header 21 shown in FIG. 2 and contains a control (C) which stores information indicating the sequence of frames. Because the destination packet terminal 7 of the data packet is connected to the main controller 52, the interface circuit 36 sets in the destination address (DA) of the MAC header 25 information indicating that a higher order bit represents a token ring 50 and a lower order bit represents the main controller 52 corresponding to a station. It also calculates the FCS for the MAC header 25, LLC header 26, packet header 23 and user data 24, adds it to the data packet as the MAC trailer 28 and sends it downstream of the token ring 30 (1015). The data packet sent to the token ring 30 is repeated through the stations (which electrically repeat the data packet) so that the data packet reaches the connecting unit 38.

Figure 11:
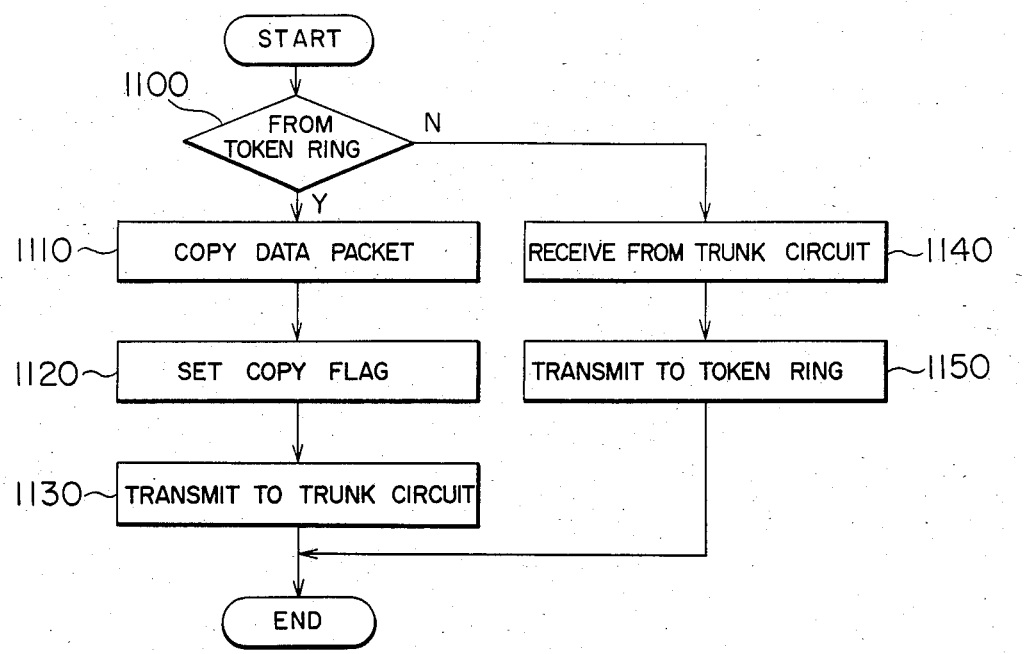
FIG. 11 is a flow chart showing a control of a connecting unit 38.

FIG. 11 shows a flow chart illustrating the control by the connecting unit 38. The connecting unit 38 checks if the packet is from the token ring (1100), and if it is, copies the data packet (1110), sets the copy flag of the MAC trailer 28 and sends it to the downstream station (1120, 1130). The data packet is finally returned to the source interface circuit 36 (1016) which checks if the copy flag in the MAC trailer 28 of the transmitted data packet is "1" (1017), and if it is, checks if the data pocket reached the connecting unit 38, and if it did, erases the data packet (1018). If the copy flag is "0", the data pocket is retransmitted (1019). The transmission from the connecting unit 38 to the connecting unit 58 of other packet exchanger 5 is now explained.

In the connecting unit 38 shown in FIG. 7, the token ring connecting unit 84 is the interface connected to the token ring 30 and it copies a data packet (addressed to the token ring 50) sent from the upstream station and stores it in the main memory 82 through the DMA including the internal bus 83 and the main memory controller 81.

The processor 80 is controlled by a program and transmits the data packet in the main memory 82 to the connecting unit 58 of the other token ring 50 by the communication controller 85.

The transmission from the connecting unit 58 which received the data packet, to the main controller 52 through the interface circuit 56 is now explained. The connecting unit 58 is identical in configuration to the connecting unit 38 and primes "'" are added to the numerals shown in FIG. 7 in order to distinguish them.

The data packet received by the communication controller 85' is stored in the main memory 82' (1140), and the data packet stored in the main memory 82' is supplied to the token ring connecting unit 84' through the DMA including the internal bus 83' and the main memory controller 81'. The token ring connecting unit 84' sends the data packet to the downstream station of the token ring 50 (1150).

The interface circuit 56 copies the data packet sent from the upstream station (1020), sets the copy flag to "1" (1025), and sends it to the downstream station. It also checks the FCS of the MAC trailer of the data packet copied and read (1030, 1035), and if it is normal, checks the LLC header 26 and checks the sequence of the data packet (1040, 1045). If it is a normal data packet, the interface circuit 56 supplies the packet header 23 and the user data 24 to the main controller 52 (1050). If the data packet is not normal, it sends a negative response in the MAC level or LLC level (1055), sends it from the interface circuit 56 to the interface circuit 36 through a reverse path to the data packet reception path, and the main controller 32 retransmits the data packet.

The transmission from the main controller 52 to the packet terminal 7 through the communication controller 51 is now explained. The main controller 52 receives the packet header 23 and the user data 24 and checks the packet serial number of the packet header 23 (905, 910). If it is incorrect, the main controller 52 sends a negative response in the pocket level to the main controller 32 in a reverse path to the data packet reception path (940, 945), and the main controller 32 retransmits the data packet to the main controller 52. If the serial number is correct, the main controller 52 checks the address information (915, 920), delivers the data packet to the communication controller 51 (935), and the communication controller 51 adds the DLC header 21 and the DLC trailer 22 of the data packet format of FIG. 2 (855, 860), and sends the data packet to the packet terminal 7 (865). When the packet terminal 7 receives the data packet, it checks the sequence of the data packet and the data error by the DLC header 21 and the DLC trailer 22. If it is incorrect, the packet terminal 7 sends a negative response back to the communication controller 51, which retransmits the data packet to the packet terminal 7 (855, 860, 865). The packet terminal 7 further checks the packet serial number by the packet header 23, and if the packets are normally received without loss of packet, it sends an affirmative response data packet to the source packet terminal 1. In this manner, the packet terminal 7 receives the frame formatted as shown in FIG. 2.

The token rings 30 and 50 can maintain a transmission rate of 4 M bits/sec or 10 M bits/sec including the LLC level processing in the main controllers 32 and 52. Since the connecting units 38 and 58 have ability to transfer the frames at a very high rate, a high speed trunk circuit having a transmission rate of 1.544 M bits/sec or 6 M bits/sec may be used as the trunk circuit 4'.

The present embodiment offers the following advantages.

(1) Since the processing in the data link level to the trunk circuit which has heretofore been carried out by the main controllers 34 and 54 for the trunk circuit between the packet exchangers is eliminated, the high transmission rate of the trunk circuit 4' is attained.

(2) Since the plurality of main controllers 34 connected to the trunk circuit is replaced by the connecting unit 38, the number of main controllers 34 can be substantially reduced. For example, where one main controller 34 is required for each 64 K bit/second trunk circuit, 25 main controllers 34 are required to attain a total throughput of 1.544 M bits/second for the plurality of trunk circuits in the prior art system. They can be replaced by one connecting unit 38 in the present invention. The multiplexers 41 and 42 are not necessary.

(3) Since the frame is transferred from the token ring 30 to the trunk circuit 4' through the connecting unit 38 in the first-in first-out fashion and not in a time slot allocation time-division fashion like the multiplexers 41 and 42, a response time between the packet terminal 1 and the packet terminal 7 is substantially improved.

(4) The utilization efficiency of the trunk circuit 4' is improved by the same reason as (3).

In the present embodiment, the token rings 30 and 50 are provided as the high speed interfaces. Alternatively, a token bus type internal transmission line may be used instead of the token ring. In this bus system, the interface circuits 36 and the connecting unit 38 are connected to a common bus and a transmission right is sequentially and periodically shifted to the interface circuit 36 and the connecting unit 38.

In accordance with the present invention, an ultra high speed data transmission is attained because the processing in the data link level is eliminated in the data transmission between the packet exchangers.

We claim:

1. A packet exchange data transmission system having at least two packet exchangers, each of said packet exchangers having a packet terminal and an external transmission line connected thereto, sending a data packet supplied from said packet terminal to said external transmission line through an internal transmission line, supplying the data packet sent from said external transmission line to said packet terminal through said internal transmission line and being connected to another packet exchanger through said external transmission line, said packet exchangers each comprising:

first means for checking a validity of the data packet sent from said packet terminal and sending the data packet to said internal transmission path, and reading in the data packet on said internal transmission line, checking a validity of the data packet and sending the data packet to said packet terminal, and second means including a memory for storing the data packet on said internal transmission line into said memory, reading out the data packet from said memory and sending the data packet to said external transmission line, and storing the data packet transmitted from said external transmission line in said memory, reading the data packet from said memory and sending the data packet to said internal transmission line, wherein said internal transmission line is a token ring constructed to send a transmission right token to each of said first and second means for acquiring a transmission right, said first means sends the data packet sent from said packet terminal to said token ring, receiving the data packet from said token ring and sending the data packet to said packet terminal, and said second means stores the data packet of said token ring into said memory, reads out the data packet from said memory and sends the data packet to said external transmission line, stores the data packet sent from said external transmission line into said memory, reads out the data packet from said memory and sends the data packet to said token ring.

2. A packet exchange data transmission system according to claim 1 wherein said first means converts the data packet sent from said packet terminal to be compatible to the interface of said token ring and converts the data packet converted to be compatible to the interface of said token ring to a data packet of the same format as that sent from said packet terminal.

* * * * *